United States Patent
van Heyden et al.

(10) Patent No.: US 6,388,348 B2
(45) Date of Patent: May 14, 2002

(54) DRIVE SYSTEM

(75) Inventors: Marcus van Heyden; Alfred Tareilus, both of Schweinfurt; Jürgen Weimer, Euerbach; Dieter Bauch-Panetzky, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/910,495

(22) Filed: Jul. 19, 2001

Related U.S. Application Data

(63) Continuation of application No. 09/595,283, filed on Jun. 15, 2000.

(30) Foreign Application Priority Data

Jun. 15, 1999 (DE) .......................................... 199 27 261

(51) Int. Cl.[7] .................................................. H02K 7/02
(52) U.S. Cl. .............................. 310/74; 310/45; 310/78
(58) Field of Search ................................. 310/74, 70 A, 310/156, 152, 153, 171, 64, 43, 45, 92, 76, 78; 74/572, 574; 123/559.1

(56) References Cited

U.S. PATENT DOCUMENTS

| | | | |
|---|---|---|---|
| 4,458,156 A | 7/1984 | Maucher | 290/38 |
| 5,207,305 A | * 5/1993 | Iverson | 192/58 |
| 5,614,777 A | * 3/1997 | Bitterly et al. | 310/74 |
| 5,962,941 A | * 10/1999 | Serdar, Jr. et al. | 310/153 |
| 6,049,750 A | * 4/2000 | Chudleigh, Jr. | 310/74 |
| 6,137,199 A | * 10/2000 | Lindsley | 310/74 |

FOREIGN PATENT DOCUMENTS

| | | | |
|---|---|---|---|
| DE | 30 48 972 | 1/1995 | F02N/5/04 |
| DE | 43 35 848 | 4/1995 | H02K/9/00 |
| DE | 44 23 577 | 8/1995 | F16F/15/18 |
| DE | 196 29 346 | 1/1998 | B60K/6/02 |

* cited by examiner

Primary Examiner—Nestor Ramirez
Assistant Examiner—Thanh Lam
(74) Attorney, Agent, or Firm—Cohen, Pontani, Lieberman & Pavane

(57) ABSTRACT

A drive system for a motor vehicle includes a drive shaft with a flywheel mass arrangement provided thereon, an electric machine for driving the drive shaft and/or obtaining electric energy from the rotating drive shaft. The electric machine has a stator arrangement and a rotor arrangement which can be rotated by the drive shaft. The rotor arrangement is connected via the flywheel mass arrangement to the drive shaft. Furthermore, the rotor arrangement is connected to the flywheel mass arrangement via a connecting region having a higher resistance to thermal conduction than at least one of the regions that adjoins the connecting region.

50 Claims, 4 Drawing Sheets

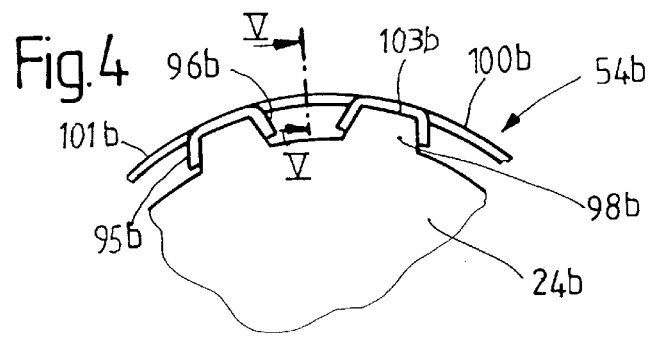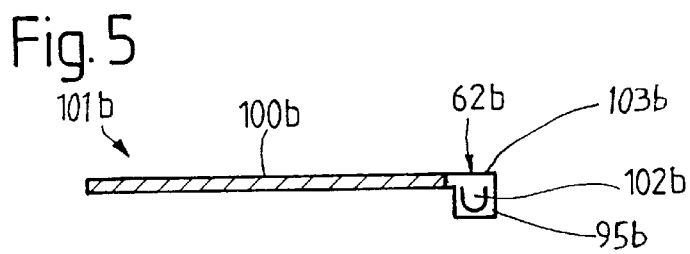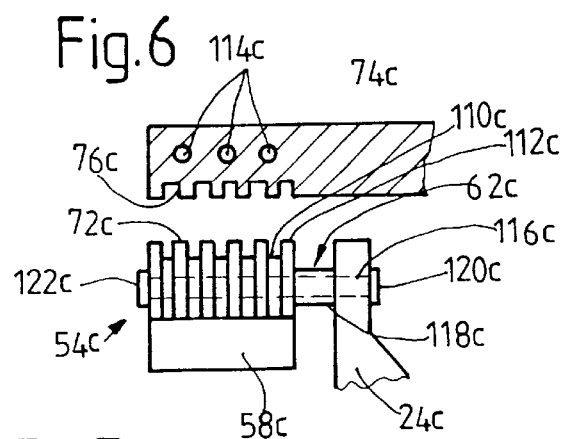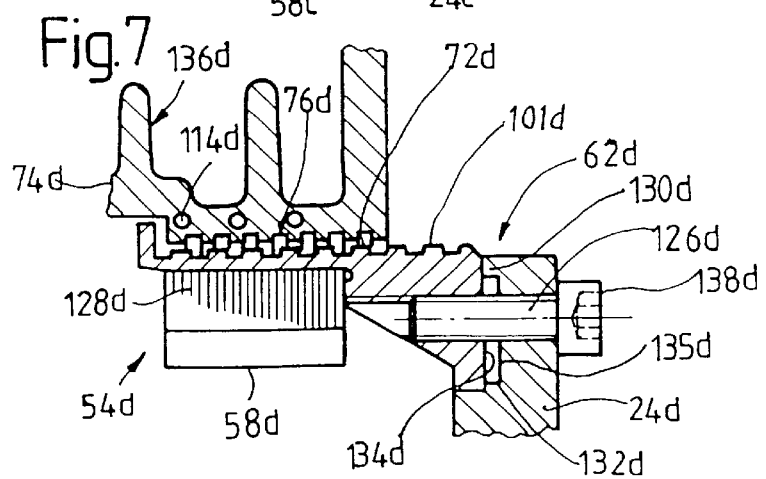

DRIVE SYSTEM

CROSS-REFERENCE TO RELATED APPLICATION(S)

This application is a continuation of U.S. patent application Ser. No. 09/595,283, filed Jun. 15, 2000.

BACKGROUND OF THE INVENTION

1. Field of the Invention

The present invention relates to a drive system for a motor vehicle comprising a drive shaft with a flywheel mass arrangement provided thereon and an electric machine connected to the shaft for rotating the drive shaft and/or for obtaining electric energy from the drive shaft, the electric machine having a stator arrangement and a rotor arrangement for rotation with the drive shaft.

2. Description of the Related Art

German reference DE 196 29 346 discloses a hybrid drive system which comprises an internal combustion engine, an automatically operable clutch, an electric motor and a transmission, which are connected in series. A rotor of the electric motor is connected in a rotationally secure fashion to a transmission input shaft of the transmission with insulation regions arranged between the electric motor and the friction clutch and/or the internal combustion engine to prevent the transfer of heat to the electric motor from these heat sources, i.e., the friction clutch and the internal combustion engine. The heat from these heat sources can impair the functionality of the electric motor. In the drive system disclosed in DE 196 29 346 A1, heating of th electric motor from these heat sources is avoided by the relatively large spatial separation between the heat sources and the electric rotor.

Another drive system is disclosed in German reference DE 44 23 577 A1 in which a disk-type flywheel is supported on a drive shaft. A radially outer region of the flywheel forms the rotor of an electric machine that is capable of exerting a torque on the drive shaft to damp torsional vibrations in the drive system. A layer of rubber material is arranged between the radially outward region of the flywheel mass and the radially inward region of the flywheel mass to provide a further vibration-damping function. No statements are made in this reference concerning the thermal properties of the various materials and particularly the components of the drive system, with the aid of which heat could be transferred to the electric machine are not arranged in the region of the electric machine.

SUMMARY OF THE INVENTION

It is an object of the present invention to provide a drive system for a motor vehicle comprising an electric machine in which the transfer of thermal energy between the electric machine and a flywheel mass arrangement is decreased to avoid impairing the functionality of the electric machine.

According to the invention, the object is achieved by a drive system for a motor vehicle comprising a drive shaft with a flywheel mass arrangement provided thereon, an electric machine connected to the drive shaft for exerting a torque for rotating the drive shaft and/or for obtaining electric energy from the drive shaft. The electric machine has a stator arrangement and a rotor arrangement connected to the drive shaft via the flywheel mass arrangement so that the rotor arrangement may be rotated by the drive shaft.

In the drive system according to the present invention, the rotor arrangement is connected to the flywheel mass arrangement via a connecting region which is a region having a higher resistance to thermal conduction than at least one adjoining region.

This connecting region may be arranged for effecting a far reaching thermal decoupling of the rotor arrangement and the flywheel mass arrangement. The result of this decoupling is that, for example, there is no risk of impairing the functionality of the entire electric machine by heat generated in the region of the flywheel mass arrangement and transferred to the rotor arrangement.

The increased resistance to thermal conduction may, for example, be provided by construction of the connecting region with an effective cross-sectional transfer area which is diminished with regard to at least one adjoining region. In this case, the effective cross-sectional transfer area is preferably diminished at least with reference to that adjoining region which is situated on the side on which the increased temperatures are present or are expected to be present.

The reduction of the effective cross-sectional transfer area may be achieved, for example, by including at least one cutout section in the connecting region and preferably a plurality of cutouts. In a preferred embodiment, the cutouts are bores that completely penetrate through the connecting region to amplify the thermal decoupling effect.

At least one cutout may be filled with a material which has a lower thermal conductivity than the material from which the connecting region is formed. The presence of such a material in the at least one cutout has the advantage that no foreign bodies can enter the interior of the rotor through this cutout and be able to cause faults there. Accordingly, the accumulation of dirt or other foreign bodies is thereby prevented in the region of the cutouts.

As an alternative, the connecting region may be formed from a material which has a lower thermal conductivity than the material from which the rotor arrangement is formed and/or the material from which the flywheel mass arrangement is formed.

To additionally remove heat generated in the region of the electric machine and thereby prevent a build up of heat in this region, particularly during an overload condition, the electric machine is arranged so that the rotor surrounds the outer radial side of the stator and at least one cooling rib is provided on the radial outer surface of the rotor.

In general, the electric machine is surrounded on the outside by a fixed housing for purposes of physical protection. In this case, it is further proposed that at least one cooling rib is provided on an inner surface of the housing. In this way, the housing has an enhanced ability to absorb the heat radiated by the electric machine.

The configuration according to the present invention of the drive system is advantageous, in particular, when the flywheel mass arrangement is a temporary heat source. That is, the present invention ensures that the impairment of the functionality of the electric machine does not occur when heat is generated in the region of the flywheel mass arrangement.

For example, the flywheel mass arrangement may comprise a flywheel of a motor vehicle friction clutch. Alternatively, the flywheel mass arrangement may comprise a part of a torque converter such, for example, as its housing.

The electric machine used in the drive system according to the present invention may, for example, comprise a starter/generator machine. This type of device is used both to start an internal combustion engine and to obtain electric energy and, if appropriate, feed the electric energy obtained into a vehicle electrical network whenever the internal combustion engine is running.

The rotor may comprise a rotor excited by permanent magnet.

The electric machine may comprise a three-phase asynchronous machine or a three-phase synchronous machine and may be excited electrically or by permanent magnet. In the case of asynchronous machines, the laminated core provided in the rotor has a relatively high thermal storage capacity and may absorb a portion of the heat which is generated during overload operation of the electric machine. However, there is a risk that when the flywheel mass arrangement is a flywheel of a clutch, for example during engagement of the clutch, there will be an at least short-term excessive rise in temperature with a corresponding impairment of the overload characteristic of the electric machine. This scenario also applies when the electric machine comprises a synchronous machine.

A drive system according to an embodiment of the present invention may comprise an electric machine with a rotor arrangement having a support element which is connected or is connectable in a rotationally secure fashion to the flywheel mass arrangement. In this embodiment, the support element preferably forms the region having a higher resistance to thermal conduction, i.e., the connecting region.

The flywheel mass arrangement may be arranged with external teeth for engaging the support element. These external teeth may simultaneously be used with an electromagnetic pickup to detect the speed of the flywheel mass arrangement, which corresponds in general to the speed of a drive unit.

The support element may comprise a plurality of engaging projections which project from a basic body for producing the rotary connection to the flywheel mass.

Alternatively, the support element may be connected, or be connectable, to the flywheel mass arrangement by a plurality of fastening bolts. To obtain a very effective thermal insulation here, a bearing surface segment of one of the flywheel mass arrangement and the support element has a smaller surface area than a bearing surface segment on the other one of the flywheel mass arrangement and the support element. For example, one bearing surface segment may form at least one bearing surface of essentially annular construction.

In a further alternative embodiment of the drive system according to the present invention, the rotor arrangement comprises a plurality of metal disk elements which are of essentially annular construction and are supported by a plurality of fastening bolts on the flywheel mass arrangement. In this embodiment, the fastening bolts preferably essentially form the region having a higher resistance to thermal conduction, i.e., the connecting region.

In this embodiment, a desired spacing between the metal disk elements, which here form a yoke for the rotor, and the flywheel mass arrangement, is effected by providing at least one spacer element between the flywheel mass arrangement and the metal disk elements. The at least one spacer element provides a higher resistance to thermal conduction with regard to the flywheel mass arrangement and/or the fastening bolts.

To further support the removal of heat in the drive system according to the present invention, a coolant duct may be arranged in a fixed portion of the drive system, i.e., a portion of the drive system which does not rotate with the rotor arrangement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 4 is an axial view of a support element of a rotor arrangement for engaging a flywheel mass according to yet another embodiment of the present invention;

FIG. 5 is a view of a longitudinal section of the support element of FIG. 4 along line V—V;

FIG. 6 is a detailed sectional view showing an alternative embodiment for connecting the rotor arrangement to the flywheel mass arrangement; and FIG. 7 is a detailed sectional view showing yet another embodiment for connecting a support element of the rotor arrangement to the flywheel mass arrangement.

DETAILED DESCRIPTION OF THE PRESENTLY PREFERRED EMBODIMENTS

Figure 1:
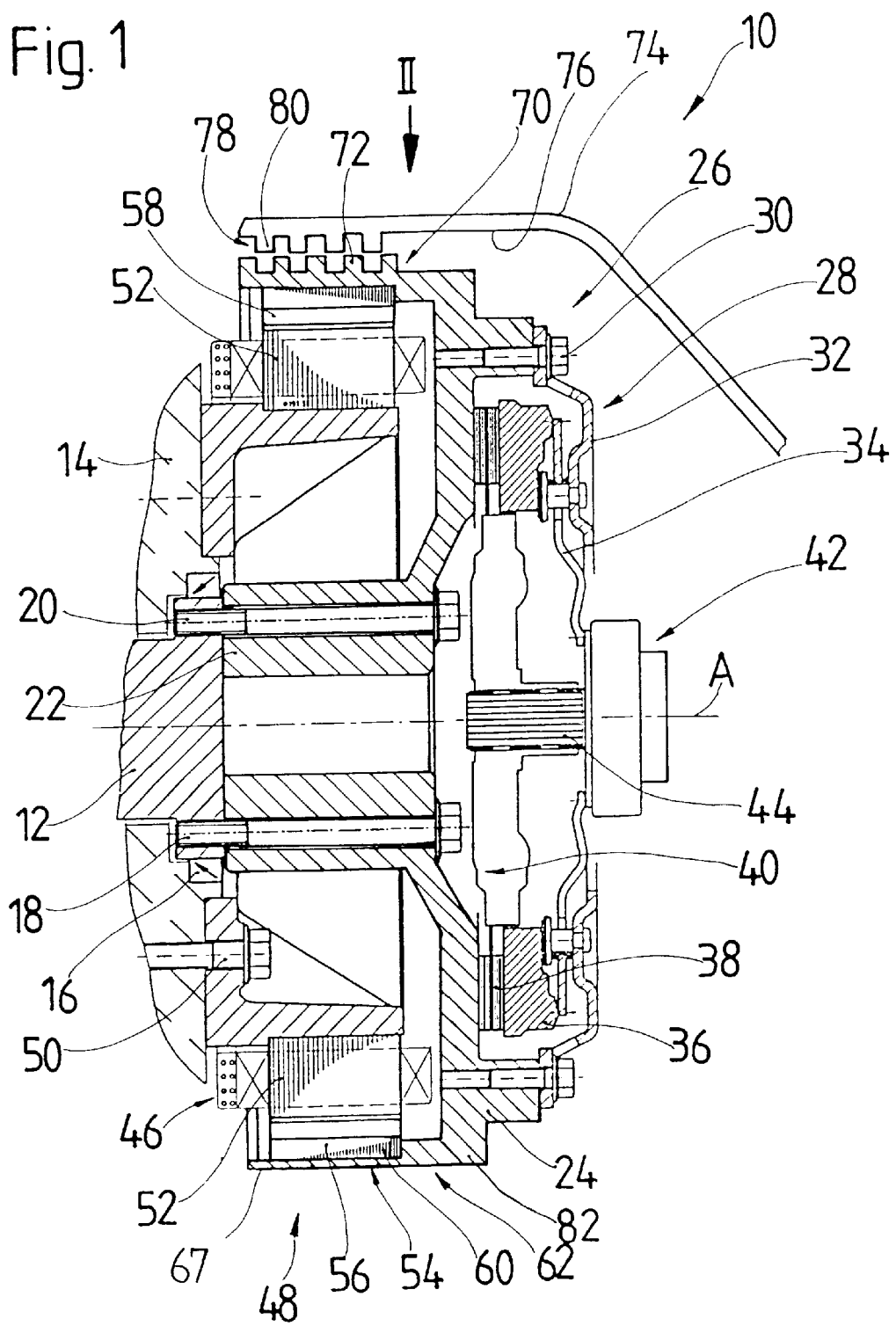
FIG. 1 is a partial longitudinal sectional view of a drive system according to an embodiment of the present invention.

A drive system 10 according to an embodiment of the present invention is shown in FIG. 1. The drive system 10 comprises a drive shaft 12 which is rotatably mounted at the end in a crankcase 14 via a bearing 16. The drive shaft 12 may, for example, comprise a crankshaft of an internal combustion engine. A flywheel mass arrangement such as, for example, a flywheel 24 of a motor vehicle friction clutch 26 is connected in a rotationally secure fashion to a crankshaft flange 18 on the drive shaft 12 via a plurality of screw bolts 20 and a spacer element 22.

The motor vehicle friction clutch 26 comprises a pressure plate assembly 28 which includes a clutch housing 32 and a pressure plate 36 which is biased toward the flywheel 24 in the direction of an axis of rotation A under the biasing of an energy storage mechanism 34. A radially outer region of the clutch housing 32 is permanently connected by screw bolts 30 to the flywheel 24. The energy storage mechanism 34 may, for example, comprise a diaphragm spring 34. A clutch disk 40 with friction linings 38 is arranged between the pressure plate 36 and the flywheel 24 such that the friction linings 38 may be clamped between the pressure plate 36 and the flywheel 24. A clutch operating mechanism 42 acts on the radially inner region of the diaphragm spring 34 to nullify the application of the force of the diaphragm spring 34 on the pressure plate 36, thereby eliminating the clamping state of the friction linings 38 between the pressure plate 36 and the flywheel 24 in the released state of the clutch 26. The clutch illustrated in FIG. 1 is only exemplary. The drive system 10 according to the present invention may comprise clutches with various modifications. For example, the clutch 26 of the drive system 10 may comprise clearance indicators for wear detection of the friction linings 38 in the region of the coupling and/or a torsion damper arrangement may be provided in the region of the clutch disk 40. The design of the clutch is of secondary importance for the principles of the present invention. Furthermore, the clutch disk 40 includes a hub 44 which may be used to connect the clutch disk in a rotationally secure fashion to a transmission input shaft of a transmission which are not shown.

Figure 2:
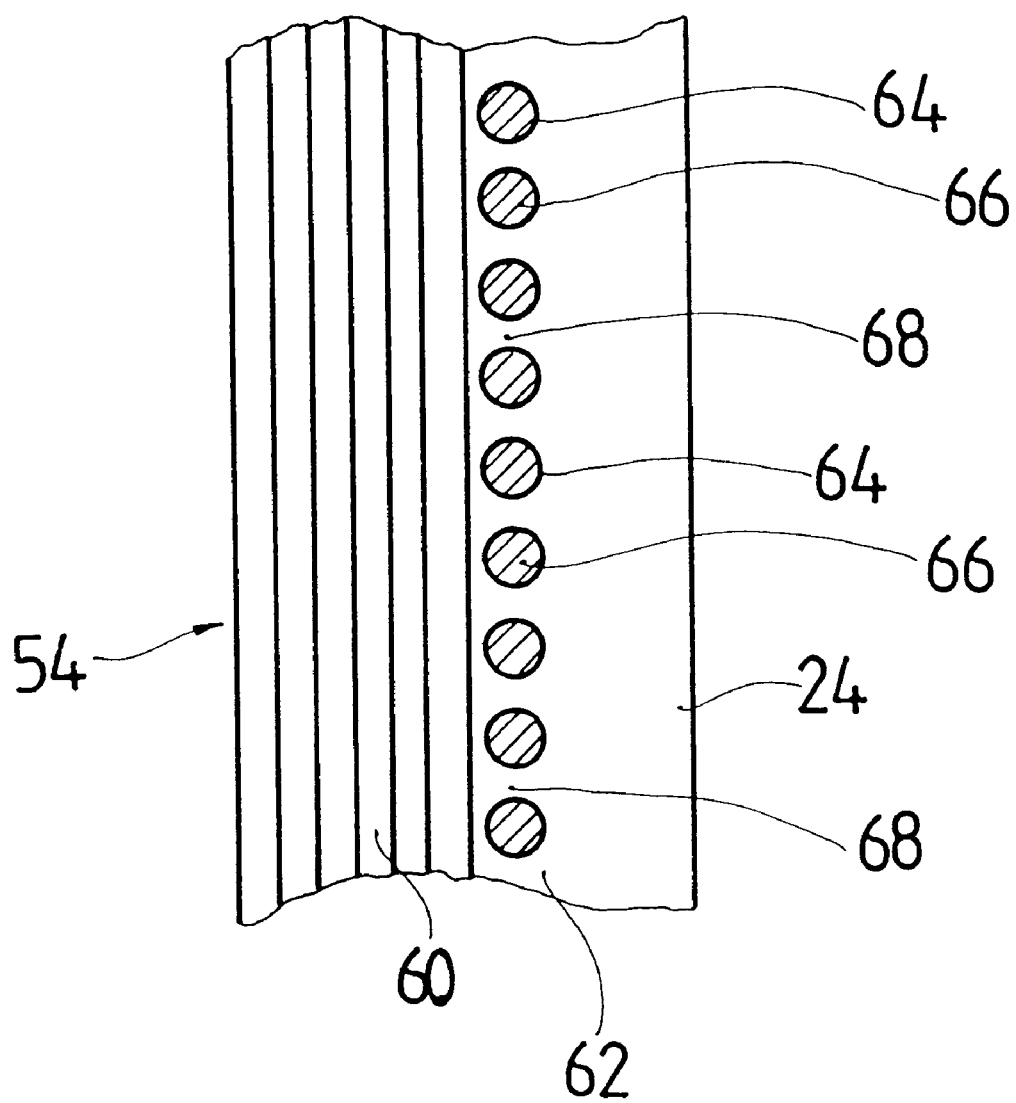
FIG. 2 is a radial view of the drive system of FIG. 1 in the direction indicated by arrow II.

Furthermore, the drive system 10 includes an electric machine 48 comprising a stator 46 permanently connected to the crankcase 14, for example, by a plurality of screw bolts 50. Alternatively, the stator 46 may be connected either directly or indirectly to a housing of the internal combustion engine (not illustrated). The stator 46 is known to comprise a plurality of stator windings 52, which form a magnetic circuit in cooperation with a magnetic or magnetizable yoke. A rotor 54 is arranged on the radially outer side of the stator 46 and comprises a laminated core 56 on which a plurality of permanent magnets 58 are arranged situated at a spacing from one another in the circumferential direction. The laminated core 56 forms a yoke of the rotor 54 via which a magnetic return path is produced inside the rotor 54. In the embodiment illustrated in FIG. 1, a part 60 of the rotor 54 which supports the laminated core 56 is constructed in one piece with the flywheel 24. Referring also to FIG. 2, a connecting region 62 comprising a plurality of through openings 64 constructed sequentially in the circumferential direction is arranged between the flywheel 24 and the part 60 of the rotor 54. In the embodiment of FIGS. 1 and 2, a material 66 is arranged in each of the through opening 64. The material 66 may, for example, comprise a ceramic material having a diminished thermal conductivity with regard to that material from which the connecting region 62 and thus also the flywheel 24 and the part 60 of the rotor 54 are formed.

The connecting region 62 produces a region of diminished thermal conductivity between the rotor 54 and the flywheel 24. The region of diminished thermal conductivity is achieved by arranging the openings 64 so that only bridge sections 68 of the material of the connecting region 62 are present between the flywheel 24 and the part 60 of the rotor 54. If the material 66 is not arranged in the through openings 64, heat transfer is conducted solely through the bridge regions 68 between the flywheel mass arrangement 24 and the rotor 54. Accordingly, the effective cross-sectional heat transfer area is diminished. However, the effective cross-sectional heat transfer area is also diminished when the material 66 is arranged in the through openings 64 because the material 66 has a diminished thermal conductivity $\lambda$.

The effective cross-sectional transfer area may be regarded as the sum of the cross-sectional area of the bridge sections 68 multiplied by the thermal conductivity $\lambda$ of the material of the connecting region 62 plus the sum of the cross-sectional areas of the material 66 multiplied by the thermal conductivity $\lambda$ of the material 66. If the material 66 is omitted, which corresponds approximately to the case that its thermal conductivity is equal to zero, the heat transfer takes place only via the bridge regions 68, and the transferred quantity of heat is proportional to the product of this cross-sectional area of the bridge sections 68 and the thermal conductivity of this material. If the thermal conductivity $\lambda$ of the material 66 is not to be regarded as zero, but is smaller than the thermal conductivity of the material of the connecting region 62, the effective cross-sectional transfer area is likewise reduced with regard to a configuration in which no through openings 64 are achieved, since the cross-sectional areas of the material 66 are to be multiplied by a smaller thermal conductivity $\lambda$ than would be the case were the material of the connecting region 62 provided there.

Accordingly, the introduction of the through openings 64 achieves at least a partial thermal decoupling of the flywheel 24 and rotor 54. As stated above, the through openings 64 ensure a diminished cross-sectional transfer area.

This arrangement prevents the intermittent generation of heat by the friction clutch 26, for example, during engaging and releasing operations, from flowing onto the rotor 54. That is, the flywheel 24 of the friction clutch 26 forms a heat storage mechanism which absorbs the heat produced during execution of engaging and releasing operations, and then outputs it into the surroundings. The operating characteristic of the electric machine 48, in particular of the rotor 54, thereby remain largely uninfluenced by temperature changes or temperature increases in the region of the friction clutch 26. The risk of excessively high temperatures in the region of the flywheel 24 also giving rise to an excessively high temperature in the region of the rotor 54 is thereby diminished.

The electric machine 48 of FIG. 1 may, for example, comprise a starter/generator arrangement used for supplying current to produce rotational energy for starting an internal combustion engine. When the internal combustion engine has been started and is itself producing rotational energy, the electric machine 48 may then operate as a generator which feeds electric energy into a motor vehicle battery. However, it is also possible, at least in specific driving situations, for the electric machine 48 to produce a torque which supplements the output of the internal combustion engine or, if appropriate, produces the sole tractive power for a vehicle.

To ensure that the thermal energy produced in the electric machine 48 during an operation of high loading can be dissipated, a cooling rib arrangement 70 is provided on an outer surface 67 of the rotor 54 as shown in the upper part of FIG. 1. The cooling rib arrangement 70 has a plurality of cooling ribs 72 extending in the circumferential direction. These cooling ribs 72 preferably extend around the rotor 54 entirely in the circumferential direction, and thereby ensure an improved removal of heat from the rotor 54. The electric machine 48 is generally incorporated into a housing 74 such as, for example, a lengthened transmission bell housing for protection. The housing 74 radially surrounds the outside of the electric machine. Accordingly, an inner surface 76 of the housing, 74 may comprise a further cooling rib arrangement 78 with a plurality of cooling ribs 80 which likewise extend completely in a peripheral fashion, preferably in the circumferential direction. Since the arrangement of the connecting region 62 prevents a transfer of heat from the rotor to the flywheel 24, the provision of such cooling rib arrangements 70, 78 facilitates removal of heat from the rotor 54. In the preferred embodiment, the cooling ribs of the cooling rib arrangements 70, 78 are arranged such that the size of their radial extent is substantially equal to their axial width. In other words, the grooves formed between individual axially succeeding ribs likewise have the same height and width. Furthermore, the preferred measure for the width and the height of such cooling ribs is in the region of 1–2 mm. However, smaller and larger measures may also be used.

To provide an increased heat storage capacity in the region of the rotor 54, the connecting region 62 could be displaced further toward the flywheel mass arrangement 24. For example, the connecting arrangement could be arranged to adjoin the screw bolts 30, with the result that the radially outer region of the flywheel 24 is assigned, in the final analysis, to the rotor 54, and not to the flywheel 24, when considering the heat storage capacities. Nevertheless, this part of the flywheel 24 would also make a contribution to the moment of inertia, just like the entire rotor 54, which is connected to the flywheel 24 in a rotationally secure fashion and thus makes a contribution to the moment of inertia.

The connecting region 62 may be formed completely from a different material such as, for example, a ceramic material than the adjoining region 82 of the flywheel 24 or the adjoining region, i.e., part 60, of the rotor 54. The connecting region 62 formed of a different material may also include through openings 62 which may be sealed by a further material conducting heat poorly. The sealing with further material prevents the intrusion of contaminants into the inner region of the rotor 64. In principle, the material of the connecting region 62 could be selected such that it simultaneously provides a diminished thermal conductivity and a relatively high strength of connection between the rotor 54 and the flywheel mass arrangement 24. The introduction of through openings or material cutouts providing an increased resistance to thermal conduction through lowering the effective transmission cross section.

Figure 3:
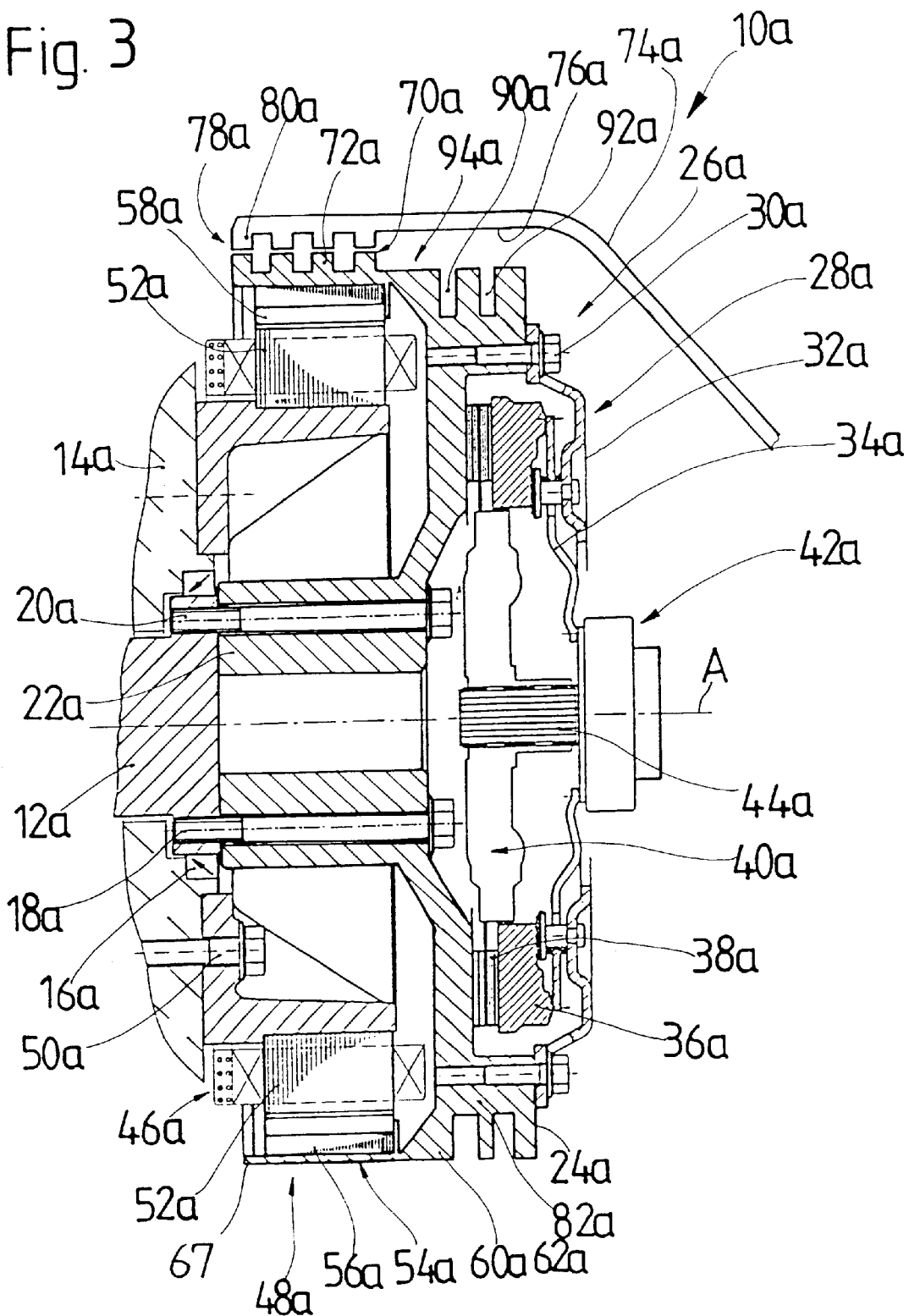
FIG. 3 is a partial longitudinal sectional view of a drive system according to another embodiment of the present invention.

FIG. 3 shows an alternative embodiment of a drive system 10a according to the present invention. Components which correspond to previously described components with regard to design and function are denoted by the same reference numeral with the addition of a suffix "a". Since the basic design essentially corresponds to the design shown in FIG. 1, only the differences in design will be considered below.

In the embodiment of the present invention according to FIG. 3, grooves 90a, 92a are provided in an outer circumferential region of the flywheel 24a. The groove 90a produces a connecting region 62a with a very small transfer cross section between the adjoining region 82a of the flywheel 24a and the adjoining region, i.e., part 60a, of the rotor 54a. This diminishing of the cross-sectional transfer area is further amplified by virtue of the fact that this thermal transfer region between the rotor 54a and the flywheel 24a is displaced radially inwards into the region of the base of the groove 90a, and is not situated in the region of the outer circumferential surface 67a of the rotor. The introduction of the grooves 90a, 92a also improves the heat dissipation characteristics of the flywheel 24a at the radially outer region of the flywheel. A further constriction 94a of the cross-sectional transfer area is situated further outside radially, with the result that the diminishing of the cross-sectional area is at least partially compensated again by the larger spacing from the axis of rotation A. Nevertheless, a further resistance to heat transfer is introduced here.

The cooling ribs 72a, 80a of the cooling rib arrangements 70a, 78a are directly opposite one another in the radial direction iun the embodiment of FIG. 3. This is different from the arrangement of FIG. 1 in which the cooling ribs 72, 80 are offset relative to one another.

FIGS. 4 and 5 show a further embodiment of the present invention. Components which correspond to components described above with regard to design and function are denoted by the same reference numerals with the addition of a suffix "b". Only the components essential for describing the differences between the previously described embodiments are illustrated in FIGS. 4 and 5.

FIGS. 4 and 5 illustrate that the radially outer circumferential region of the flywheel 24b has teeth 98b which project radially outward. These teeth 98b cooperate with an electromagnetic pickup (not shown) to detect the rotational speed of the flywheel 24b. Furthermore, the teeth 98b permit the rotor 54b to be coupled to the flywheel 24b in a fashion which is rotationally secure and axially fixed. In the embodiment illustrated, the rotor 54b comprises a support element 101b that has an annular, cylindrical-shaped body region 100b. The support element 101b farther comprises projections 103b adjoining this body region 100b which are assigned to the teeth 98b. Lugs 95b, 96b arranged on the circumferential sides of each projection 103b are bent radially inward. The lugs 95b, 96b are formed in cooperation with the projections 103b such that they form mating teeth for engaging the teeth 98b, thereby forming a rotationally secure coupling of the support element 101b to the flywheel 24b. Furthermore, at least some of the lugs 95b, 96b comprise stampings or protuberances 102b which are directed toward the teeth 98b. When the clutch 26 (see FIG. 1) is engaged, the stampings or protuberances 102b engage in a corresponding cutout on the side surfaces of the teeth 98b, thus also creating an axially fixed coupling of the support element 101b of the rotor 54b to the flywheel 24b. The inner circumferential surface of the support element 101b may support a plurality of permanent magnets distributed in the circumferential direction. Accordingly, the support element 101b formed, for example, from sheet metal then simultaneously forms the yoke of the rotor 54b. However, it is also possible in principle for disk-like metal plates additionally to be provided as yoke on the inner circumferential surface of the support element 101b.

In this embodiment, the connecting region 62b is formed in the transition region from the body region 100b to the projections 103b which produces a relatively small thermally conducting cross section. This means that a region is created here which provides a diminished cross section for thermal conduction with regard both to the body region 100b and to the projections 103b, and thus makes a considerable or substantial contribution to the thermal insulation between the flywheel mass arrangement 24b and the rotor of the permanent magnets. The rotor arrangement 54b is therefore in contact via this connecting region 62b with the flywheel mass arrangement 24b, the connecting region 62b having to be assigned in the embodiment illustrated to the rotor arrangement 54b in terms of assembly.

A further alternative embodiment of the drive system 10c according to the present invention is shown in FIG. 6. Components which correspond to previously described components with regard to design and function are denoted by the same reference numeral with the addition of a suffix "c". Only the components essential for describing the differences between the previously described embodiments are illustrated in FIG. 6.

FIG. 6 shows that the rotor arrangement 54c comprises a plurality of disk-like metal elements 110c, 112c, comprising smaller elements 110c and larger elements 112c, the smaller elements having a smaller outside diameter than the larger elements 112c. The smaller and larger elements 110c, 112c are alternately arranged with one another in the axial direction. The permanent magnets 58c are once again supported on the inside of these disk-like elements 110c, 112c. Cooling ribs 72c of the rotor arrangement 54c are simultaneously formed radially outwards by the disk elements 110c, 112c of different diameter. As already described previously, the cooling rib arrangement 76c fixed to the housing is situated opposite these cooling ribs 72c at a radial spacing. Furthermore, a duct arrangement with a plurality of coolant ducts 114c is provided in this housing 74c, so that the heat transferred from the rotor arrangement 54c onto the housing 74c by radiation or convection may be more effectively removed by the coolant flowing through the ducts 114c. The duct or ducts 114c may be connected to the cooling system of a drive unit.

FIG. 6 also shows that the rotor arrangement 54c is supported on the flywheel 24c by a plurality of bolts, for example screw bolts or rivet bolts 116c, arranged in succession in the circumferential direction. Spacer elements 118c are arranged between the flywheel 24c and the disk element 112c situated closest to the flywheel 24c. The spacer element 118c provides a spatial separation of the rotor arrangement 54c from the flywheel mass arrangement 24c and additionally offers thermal insulation. In FIG. 6, heat may be transferred from the flywheel 24c to the bolt 116c, for example. in the surface region in which a bolt head 120c is supported on the flywheel mass arrangement 24c. The bolt shaft of the bolt 116c is held in an opening of larger diameter, thereby preventing heat transfer to the bolt shaft. Heat conducted via the bolt or the bolts 116c may be transferred onto the disk elements 110c, 112c at least via the bolt head situated at the other axial end or via a nut 122c. Heat may also be conducted through the shaft region of the bolt 116c. Furthermore, the connecting region 62c is additionally formed by the spacer element 118c which is preferably formed from a material which has an increased resistance to thermal conduction with regard to the material of the bolts 116c or the material of the flywheel mass arrangement 24c. To further improve the thermal insulation, an insulation element with a high resistance to thermal conduction may be arranged between the bolt head 120c and the flywheel mass arrangement 24c so that there is no mutual bearing contact between any two metal elements in the connecting region 62c, i.e., the rotor arrangement 54c is supported with reference to the flywheel mass arrangement 24c only via the spacer elements 118c and the insulation element or elements (not illustrated).

In the embodiment of FIG. 6, the disk-like sheet metal elements 101c, 112c may have a thickness in the range of 0.25–0.5 mm.

A further embodiment according to the present invention is shown in FIG. 7. Components which correspond to previously described components with regard to design and function are denoted by the same reference numerals with the addition of a suffix "d".

The rotor arrangement 54d shown in FIG. 7 has a support element 101d which is screwed onto the flywheel 24d via a plurality of screw bolts 126d. The permanent magnets 58d and a plurality of metal disk elements 128d which support the permanent magnets and form a yoke, are once again, for example, bolted on an inner surface of the support element 101d. However, the disk elements 128d are not required for this embodiment and may be omitted. Two supporting surface regions 130d, 132d are arranged on the flywheel mass arrangement 24d with a radial spacing therebetween. The two supporting surface regions 130d, 132d run in the circumferential direction around the axis of rotation of the flywheel mass arrangement 24d and form a deepened region 135d between themselves. This deepened region 135d is penetrated by the bolts 126d. When the screw bolts 126d are tightened, the support element 101d is pulled with its surface 134d against the surface regions 130d, 132d with a bearing contact being formed here only in these surface regions 132d, 130d between the flywheel mass arrangement 24d and the support element 101d of the rotor arrangement 54d. These surface regions bearing against one another thus form the connecting region 62d, which provides a relatively high resistance to thermal conduction in the case of transfer of heat from the flywheel mass arrangement 24d to the support element 101d. To minimize the transfer of heat between the support element 101d and the flywheel 24d, the radial inner surface of the support element 101d adjacent to the surface region 132d the support element 101d should be prevented from contacting a corresponding surface of the flywheel 24d. However, if a centering function is desired, a bearing contact may be provided there. In addition, or alternatively, a depression corresponding to the deepened region 135d on the support element 101d in the region of the surface 134d may be provided for a centering function.

The cooling ribs 72d on the outer circumferential surface of the support element 101d oppose the cooling rib arrangement 76d of the housing 74d. Furthermore, the outer surface of the housing 74d further comprises cooling ribs 136d which make a contribution to more effective thermal radiation from the housing 74d to the surroundings.

A further contribution to the transfer of heat in FIG. 7 is accomplished by each screw bolt in contact both with the flywheel 24d and with the support element 101d. To minimize this contact region, the opening in the flywheel mass arrangement 24d through which the bolt or bolts 126d penetrate may once again have a larger diameter than the shaft of the bolts 126d, but an at least slightly smaller diameter than a respective bolt head 138d. This then provides a bearing contact between the bolt 126d and the flywheel mass arrangement 124d only in a relatively small surface region of the head 138d. Furthermore, the bolt 126d may be formed from material with an increased resistance to thermal conduction, or it would be possible for there to be situated between the head 138d of the bolt and the flywheel mass arrangement 24d an insulating element which has a lower coefficient of thermal conductivity than the bolt 126d or the flywheel mass arrangement 24d itself.

It may be seen from the preceding description of the embodiments of FIGS. 4 to 7 that for the purpose of the present invention the statement that the rotor arrangement is connected to the flywheel mass arrangement via a connecting region signifies not only the integral physical connection of these two assemblies, but likewise the heat transfer connection produced by the mutual contact of these two components.

The result of the present invention is that various measures render it difficult to transfer heat between a rotor of an electric machine and a heat source, for example a flywheel of a clutch or, for example, also a torque converter, that is to say a housing thereof, with the result that in the event of the production of heat in the region of the flywheel mass arrangement, that is to say of the flywheel or the torque converter housing, for example, the operating characteristic of the electric machine, particularly in the region of the rotor thereof, can remain virtually unimpaired. Since, also, the heat flux from the rotor to the flywheel mass arrangement is impaired in this way, the provision of cooling ribs in the case of the external-rotor machine illustrated means that even the heat produced, in particular in the overload or high-load operation of the electric machine, in the region of the rotor can be dissipated to the outside.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A drive system for a motor vehicle, comprising:
a drive shaft arranged for rotating about an axis of rotation;
a flywheel mass arrangement arranged on said drive shaft for rotating with said drive shaft;
an electric machine having a stator arrangement and a rotor arrangement rotatable relative to said stator arrangement for rotation about said axis of rotation, said rotor arrangement being connected to said drive shaft via said flywheel mass arrangement such that said electric machine is operative for one of exerting a torque for rotating said drive shaft and obtaining electric energy from rotation of said drive shaft, wherein said flywheel mass arrangement comprises an intermittent heat source;
a connecting region arranged between a first adjoining region of said flywheel mass arrangement and a second adjoining area of said rotor arrangement for connecting said rotor arrangement to said flywheel mass arrangement, said connecting region comprising at least one cutout penetrating through said connecting region; and
a material arranged for filling said at least one cutout, said material having a lower thermal conductivity than a material of said connecting region surrounding said at least one cutout such that said connecting region has a higher resistance to thermal conduction than at least one of said first and second adjoining regions.

2. The drive system of claim 1, wherein said connecting region comprises a lower thermal conductivity relative to at least one of said rotor arrangement and said flywheel mass arrangement.

3. The drive system of claim 1, wherein said rotor arrangement surrounds the radial outer side of said stator arrangement and said drive system further comprises a cooling rib arranged on an outer surface of said rotor arrangement.

4. The drive system of claim 3, further comprising a fixed housing surrounding a radial outer side of said electric machine and a further cooling rib is arranged on an inner surface of said housing.

5. The drive system of claim 1, wherein said flywheel mass arrangement comprises a flywheel of a motor vehicle friction clutch.

6. The drive system of claim 1, wherein the flywheel mass arrangement comprises a portion of a torque converter.

7. The drive system of claim 1, wherein said electric machine comprises a starter/generator machine.

8. The drive system of claim 1, wherein said rotor arrangement comprises a rotor excited by a permanent magnet.

9. The drive system of claim 1, wherein said electric machine comprises one of a three-phase asynchronous machine and a three-phase synchronous machine.

10. The drive system of claim 1, further comprising at least one coolant duct arranged in a fixed arrangement relative to said stator arrangement.

11. A drive system for a motor vehicle, comprising:
a drive shaft arranged for rotating about an axis of rotation;
a flywheel mass arrangement arranged on said drive shaft for rotating with said drive shaft, wherein at least one groove is arranged on a radially outer perimeter of said flywheel, a radially inner part of said groove being delimited by a groove base;
an electric machine having a stator arrangement and a rotor arrangement rotatable relative to said stator arrangement for rotation about said axis of rotation, said rotor arrangement being connected to said drive shaft via said flywheel mass arrangement such that said electric machine is operative for one of exerting a torque for rotating said drive shaft and obtaining electric energy from rotation of said drive shaft, wherein said flywheel mass arrangement comprises an intermittent heat source; and
a connecting region arranged between a first adjoining region of said flywheel mass arrangement and a second adjoining area of said rotor arrangement, said connecting region connecting said rotor arrangement to said flywheel, wherein said connecting region includes a diminished cross-sectional transfer area relative to said first and second adjoining regions such that said connecting region has a higher resistance to thermal conduction than at least one of said first and second adjoining regions, said connecting region being arranged proximate said base of said at least one groove.

12. The drive system of claim 11, wherein said rotor arrangement surrounds the radial outer side of said stator arrangement and said drive system further comprises a cooling rib arranged on an outer surface of said rotor arrangement.

13. The drive system of claim 12, further comprising a fixed housing surrounding a radial outer side of said electric machine and a further cooling rib is arranged on an inner surface of said housing.

14. The drive system of claim 11, wherein said flywheel mass arrangement comprises a flywheel of a motor vehicle friction clutch.

15. The drive system of claim 11, wherein the flywheel mass arrangement comprises a portion of a torque converter.

16. The drive system of claim 11, wherein said electric machine comprises a starter/generator machine.

17. The drive system of claim 11, wherein said rotor arrangement comprises a rotor excited by a permanent magnet.

18. The drive system of claim 11, wherein said electric machine comprises one of a three-phase asynchronous machine and a three-phase synchronous machine.

19. The drive system of claim 11, further comprising at least one coolant duct arranged in a fixed arrangement relative to said stator arrangement.

20. A drive system for a motor vehicle, comprising:
a drive shaft arranged for rotating about an axis of rotation;
a flywheel mass arrangement arranged on said drive shaft for rotating with said drive shaft;
an electric machine having a stator arrangement and a rotor arrangement rotatable relative to said stator arrangement for rotation about said axis of rotation, said rotor arrangement being connected to said drive shaft via said flywheel mass arrangement such that said electric machine is operative for one of exerting a torque for rotating said drive shaft and obtaining electric energy from rotation of said drive shaft, wherein said flywheel mass arrangement comprises an intermittent heat source; and a connecting region arranged between a first adjoining region of said flywheel mass arrangement and a second adjoining area of said rotor arrangement, said first adjoining region comprising an external toothing on a radially outer peripheral area of said flywheel mass arrangement and said second adjoining region comprising projections projecting from a base of a carrier element of said rotor arrangement, said projections engage said external toothing for fixing said carrier to said flywheel with respect to rotation, said connecting region comprising an area of engagement between said projections and said base of said carrier element and having a higher resistance to thermal conduction than at least one of said first and second adjoining regions.

21. The drive system of claim 20, wherein said carrier element also comprises a higher resistance to thermal conduction than said at least one of said first and second adjoining regions.

22. The drive system of claim 20, wherein said rotor arrangement surrounds the radial outer side of said stator arrangement and said drive system further comprises a cooling rib arranged on an outer surface of said rotor arrangement.

23. The drive system of claim 22, further comprising a fixed housing surrounding a radial outer side of said electric machine and a further cooling rib is arranged on an inner surface of said housing.

24. The drive system of claim 20, wherein said flywheel mass arrangement comprises a flywheel of a motor vehicle friction clutch.

25. The drive system of claim 20, wherein the flywheel mass arrangement comprises a portion of a torque converter.

26. The drive system of claim 20, wherein said electric machine comprises a starter/generator machine.

27. The drive system of claim 20, wherein said rotor arrangement comprises a rotor excited by a permanent magnet.

28. The drive system of claim 20, wherein said electric machine comprises one of a three-phase asynchronous machine and a three-phase synchronous machine.

29. The drive system of claim 20, further comprising at least one coolant duct arranged in a fixed arrangement relative to said stator arrangement.

30. A drive system for a motor vehicle, comprising:

a drive shaft arranged for rotating about an axis of rotation;

a flywheel mass arrangement arranged on said drive shaft for rotating with said drive shaft;

an electric machine having a stator arrangement and a rotor arrangement rotatable relative to said stator arrangement for rotation about said axis of rotation, said rotor arrangement being connected to said drive shaft via said flywheel mass arrangement such that said electric machine is operative for one of exerting a torque for rotating said drive shaft and obtaining electric energy from rotation of said drive shaft, wherein said flywheel mass arrangement comprises an intermittent heat source; and a connecting region arranged between a first adjoining region of said flywheel mass arrangement and a second adjoining area of said rotor arrangement, said connecting region connecting said rotor arrangement to said flywheel and having a higher resistance to thermal conduction than at least one of said first and second adjoining regions, wherein said connecting region comprises a plurality of fastening bolts connecting said rotor arrangement to said flywheel mass arrangement and a spacer element arranged between the rotor arrangement and said flywheel mass arrangement.

31. The drive system of claim 30, wherein said rotor arrangement comprises a plurality of metal disk elements connected to said flywheel mass arrangement by said plurality of fastening bolts.

32. The drive system of claim 30, wherein said rotor arrangement surrounds the radial outer side of said stator arrangement and said drive system further comprises a cooling rib arranged on an outer surface of said rotor arrangement.

33. The drive system of claim 32, further comprising a fixed housing surrounding a radial outer side of said electric machine and a further cooling rib is arranged on an inner surface of said housing.

34. The drive system of claim 30, wherein said flywheel mass arrangement comprises a flywheel of a motor vehicle friction clutch.

35. The drive system of claim 30, wherein the flywheel mass arrangement comprises a portion of a torque converter.

36. The drive system of claim 30, wherein said electric machine comprises a starter/generator machine.

37. The drive system of claim 30, wherein said rotor arrangement comprises a rotor excited by a permanent magnet.

38. The drive system of claim 30, wherein said electric machine comprises one of a three-phase asynchronous machine and a three-phase synchronous machine.

39. The drive system of claim 30, further comprising at least one coolant duct arranged in a fixed arrangement relative to said stator arrangement.

40. A drive system for a motor vehicle, comprising:

a drive shaft arranged for rotating about an axis of rotation;

a flywheel mass arrangement arranged on said drive shaft for rotating with said drive shaft;

an electric machine having a stator arrangement and a rotor arrangement rotatable relative to said stator arrangement for rotation about said axis of rotation, said rotor arrangement being connected to said drive shaft via said flywheel mass arrangement such that said electric machine is operative for one of exerting a torque for rotating said drive shaft and obtaining electric energy from rotation of said drive shaft, wherein said flywheel mass arrangement comprises an intermittent heat source; and a connecting region arranged between a first adjoining region of said flywheel mass arrangement and a second adjoining area of said rotor arrangement, said connecting region connecting said rotor arrangement to said flywheel and having a higher resistance to thermal conduction than at least one of said first and second adjoining regions, wherein said rotor arrangement comprises a support element connected with respect to rotation to the flywheel mass arrangement for forming said connection region and wherein one of said flywheel mass arrangement and said support element comprises a first bearing surface and the other of said flywheel mass arrangement and said support element comprises a second bearing surface, said first bearing surface having a smaller surface area than a second bearing surface segment, said first bearing surface comprises two supporting surface sections each comprising an annular construction such that a deepened region is formed therebetween.

41. The drive system of claim 40, wherein said support element forms a region with an increased thermal resistance.

42. The drive system of claim 41, wherein said support element is connected to said flywheel mass arrangement via a plurality of fastening bolts.

43. The drive system of claim 40, wherein said rotor arrangement surrounds the radial outer side of said stator arrangement and said drive system further comprises a cooling rib arranged on an outer surface of said rotor arrangement.

44. The drive system of claim 43, further comprising a fixed housing surrounding a radial outer side of said electric machine and a further cooling rib is arranged on an inner surface of said housing.

45. The drive system of claim 40, wherein said flywheel mass arrangement comprises a flywheel of a motor vehicle friction clutch.

46. The drive system of claim 40, wherein the flywheel mass arrangement comprises a portion of a torque converter.

47. The drive system of claim 40, wherein said electric machine comprises a starter/generator machine.

48. The drive system of claim 40, wherein said rotor arrangement comprises a rotor excited by a permanent magnet.

49. The drive system of claim 40, wherein said electric machine comprises one of a three-phase asynchronous machine and a three-phase synchronous machine.

50. The drive system of claim 40, further comprising at least one coolant duct arranged in a fixed arrangement relative to said stator arrangement.

* * * * *